Nov. 27, 1962            L. PÉRAS            3,065,761

ELASTIC VALVES FOR FLUIDS UNDER PRESSURE

Filed Sept. 29, 1959            2 Sheets-Sheet 1

Nov. 27, 1962  L. PÉRAS  3,065,761
ELASTIC VALVES FOR FLUIDS UNDER PRESSURE
Filed Sept. 29, 1959  2 Sheets-Sheet 2

United States Patent Office 3,065,761
Patented Nov. 27, 1962

3,065,761
ELASTIC VALVES FOR FLUIDS UNDER
PRESSURE
Lucien Péras, Billancourt, France, assignor to Regie
Nationale des Usines Renault, Billancourt, France
Filed Sept. 29, 1959, Ser. No. 843,254
Claims priority, application France Sept. 27, 1955
10 Claims. (Cl. 137—102)

This is a continuation-in-part of my co-pending application Ser. No. 611,533 of September 24, 1956 now Patent No. 2,941,544.

The invention relates to valves in elastic material, rubber or plastic, for fluids under pressure and concerns improvements to these members permitting the creation or the suppression of leakages through the joint or valve as a function of the pressure.

The improvements, object of the invention, consist in providing, in these valves, orifices or slits of very small section obtained without removal of material or with only a slight removal in the regions of predetermined contour, the said orifices remaining closed or open for pressures of fluid below a certain value, for increasing pressures above this value, they open or close creating leakages of which the flow increases with the pressure or becoming tight, the action of the said valves being due to the effect of unilaterally or bilaterally variable pressures.

These improvements may also be applied to elastic valves intended to be used in a valve body connected to an enclosed space to be controlled, the said valve having to open in order to permit either the passage of fluids contained in the said enclosed space when the pressure prevailing in the same exceeds a pre-determined value, or in addition the admission of fluids into the said enclosed space when a certain depression takes place there.

Finally, valves of this kind may be more particularly adapted with a view to their application in installations comprising a distributor and a using apparatus such as a pneumatic jack in which the expanded air after motive action must be rapidly evacuated.

In installations of the type mentioned, it is generally the distributor which evacuates the exhaust air, which has passed through the entire length of piping connecting the distributor to the jack; serious trouble frequently results from this.

First of all an important loss of load which does not facilitate the rapid evacuation of the jack: the movement of the latter cannot then be accomplished in the prescribed time.

Then, the volume of this piping may be greater than the capacity of the jack, so that the air will not be renewed, but simply expanded in the piping, this prevents a good lubrication of the cylinder of the jack by means of a lubricator placed on the air supply piping.

Moreover, the joints or valves, according to the invention, obviate, owing to their shape and their elastic construction, the use of metallic parts, such as springs, slide valves, balls, which are often the cause of much trouble as a result of their corrosion. Finally, the replacement of metallic parts by a plastic system forming spring and valve enables an aggregate to be obtained which is simpler, more economical, easier to install, which has a greater resistance to wear and which has a greater operating efficiency, particularly in the case where the pressures involved are very small.

In any case, the details of the invention will be more clearly apparent from the several methods of embodiment, which will now be described by way of non-limitative examples and with reference to the annexed drawings, in which.

In FIGURES 1 to 9, there have been shown several forms of embodiment of a valve adapted to be mounted in a valve body placed between a distributor and a using apparatus.

Figure 1:
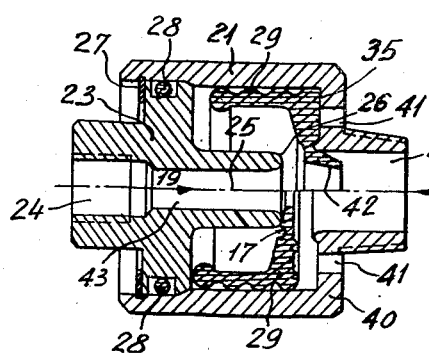
FIGURES 1, 4 and 7 show, seen in section, three forms of different embodiments of valve mounted in a valve body placed between a distributor and a using apparatus. Each upper half-view shows the valve in the position for admission of compressed air and each lower half-view in the exhaust position.
Figure 2:
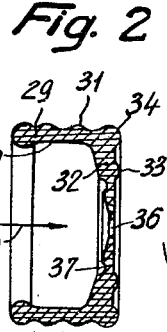
FIGURES 2, 5 and 8 show a separate view of the packings corresponding respectively to the FIGURES 1, 4 and 7.
Figure 3:
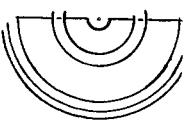
FIGURES 3, 6 and 9 are views from above of these same packings.

Referring more particularly to the form of embodiment indicated in FIGURES 1, 2 and 3, it will be seen that the device comprises a valve body 21 carrying a tube 22 and provided with a cover 23 comprising a tube 24 and a pipe 25 terminated by a seat 26. The cover is engaged in the body 21 in which it is held by a clamping clip 27. A toric joint 28 ensures the tightness of the assembly of the stopper in the body, this joint being placed in a groove of 23 or of 21. Inside the body there is placed the valve 29 shown separately in FIGURE 2. This valve has the shape of a cylindrical casing with uniform internal wall 30 and of which the external surface is provided with circular shoulders 31 which ensure tightness. The back 32 has a circular semi-round lip 33 which co-operates with the semi-toric edge 34 in such a way as to form a double tightness joint when the back of packing 32 rests on the flat seat formed by the back 35 of the body 21. An orifice 36 is provided in the back 32, the thickness of which is reduced, as shown in the drawing, to the interior of a circle limited by a circular groove 37.

The operation of the whole is the following:

When the pressure of air acts as shown by the arrow 39 (FIGURE 1, upper part), the packing 29 is pushed towards the back 40 of the valve on which it is applied, the lips 33 and 34 blocking orifices 41 provided in the back 40. Owing to the pressure, the thinner part 42 of the back of the packing opens because of the enlargement of the orifice 36, pivoting about the groove 37, and the air passes freely between the edges of packing 42 folded towards the jack. When the piston of the jack has ended its travel, the pressure of air is equalised on both sides of the valve and the edges 42 resume their place in accordance with the drawing.

At the moment when the distributor opens, the air evacuation orifice, the depression created at 43 causes the flow of the air from the jack in the opposite direction, arrow 38, the packing 29 is then vigorously displaced towards the cover 23 (FIGURE 1, lower half view) and the back 32 comes to bear against the seat 26 of the valve. This displacement uncovers the orifices 41 through which the exhaust air is rapidly forced into the atmosphere, freeing in a reduced time the exhaust side of the cylinder. In order to achieve its maximum effectiveness, the valve will be placed as close as possible to the jack. The distributor can then be placed in any position, even very remote.

It will be seen that the orifice 36 has a dual role; it permits the fluid to pass into the channel 43 in the direction 38 or 39 and the diaphragm which forms the back 32 to open out owing to the effect of the pressure 39, as shown in FIGURE 1, upper half view. This orifice 36 could also be replaced by two cross-shaped slits.

Figure 4:
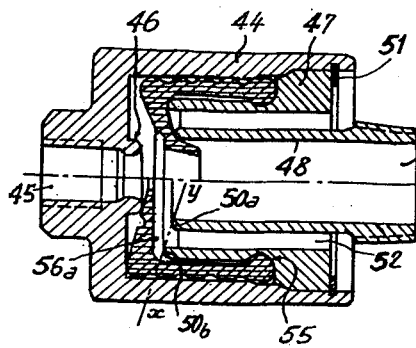
Figure 5:
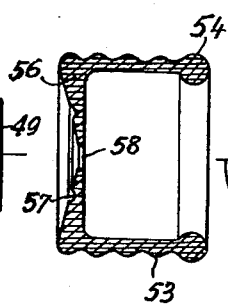
Figure 6:
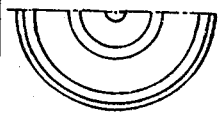

The FIGURES 4, 5 and 6 show another form of embodiment of a valve ensuring equally the supply then the rapid evacuation of the exhaust air from a jack or other similar apparatus.

In this embodiment, the valve body 44 is found again with its tube 45, the seat 46, the cover 47 carrying the pipe 48 and the tube 49 as well as the packing seat 50, the two edges of which 50a and 50b are aligned according to a generatrix xy of conical shape taken by the back 56a of the valve when it is pushed back towards the seat. The cover 47 is held by a clamping clip 51 and around the pipe 48 of the cover there are provided, following a circular distribution, openings 52 which terminate on the outside of the valve.

The valve has the form shown in FIGURE 5. Differing from that of FIGURE 2, the body is compressible. For this purpose, it is provided with shoulders 53 and the packing is fixed by its toric edge 54 which fits into the housing 55 of the cover.

This valve can be mounted as previously on the supply line of a jack; the tubes 45 and 49 being connected respectively to the distributor and to the jack. The compressed air entering by the tube 45 exerts a pressure on the back 56 of the packing which is compressed towards the cover as is shown by the upper half-section of FIGURE 4. In this movement, the back is pressed strongly against the seat 50 of the evacuation openings and blocks them. The circle of the back of the packing delimited by the circular groove 57 opens out owing to the effect of the pressure in the pipe 48 acting on the hole 58 provided in the back and allows the air to pass freely towards the jack.

When the air circuit is reversed (FIGURE 4, lower half-view) owing to the effect of the evacuation of the air by the distributor, the packing regains its place and uncovers the exhaust openings 52. The exhaust air is thus rapidly evacuated.

It will be noted that the toric edge 54 forms a tight joint between the cover and the valve body, it becomes unnecessary to provide a supplementary joint as in the case of the preceding figure.

Figure 7:
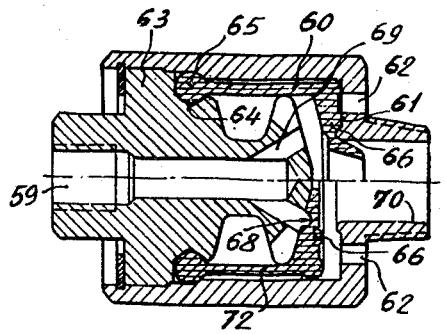
Figure 8:
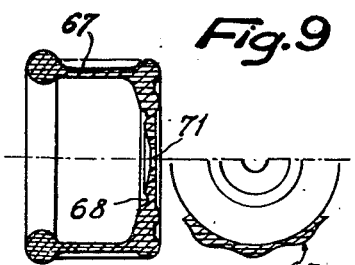
Figure 9:
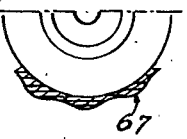

FIGURES 7, 8, 9 show another alternative according to this embodiment. The air under pressure entering by the orifice 59, then the pipes 60, presses the back 66 of the valve 60 against the back 61 of the valve body, blocking the orifices 62. Although the valve is immobilised in the body by the cover 63 and the grooves 64 owing to the toric edge 65 with which it is provided, and the valve is arranged so as to be under tension when it occupies the position shown in the lower half-view, the displacement of the back 66 is possible by virtue of the fillets 67 which confer a high degree of elasticity.

The same result could likewise be attained by suppressing the fillets 67 and making the part 72 narrower. In this embodiment, the normal condition of the valve would be that shown in the lower half-view of FIGURE 7. But the life of the valve would be lessened because of the greater elastic tensions in the narrow part.

The operation takes place as follows:

Owing to the effect of the pressure coming from the tube 59, the wall of the back of the valve delimited by the circular groove 68 opens out into the tube 70, taking advantage of the orifice 71 which expands and allows the air to pass towards the jack, stopping up the outlet orifices 62.

At the moment of reversal of direction of the pressure, resulting from putting the jack to the exhaust, the back of valve 66, attracted by the elastic tension of the fillets 67, assumes again its initial position, (FIGURE 7, lower half-view), closes the pipes 69 and uncovers the orifices 62. At this moment, there is rapid evacuation of the exhaust air from the jack.

In the case mentioned previously where the fillets 67 being suppressed, the normal form of the valve is that of the lower half-view (FIGURE 7), the extension and the backward movement of the wall 66 of the valve are effected, as in the preceding case, owing to the thrust of the air coming from the pipes 59 or 70, thus uncovering or closing the orifices 69 and 62.

In FIGURES 10 to 16, there have been shown two examples of embodiment of a valve adapted to be mounted in a valve body connected to an enclosed space to be controlled.

Figure 10:
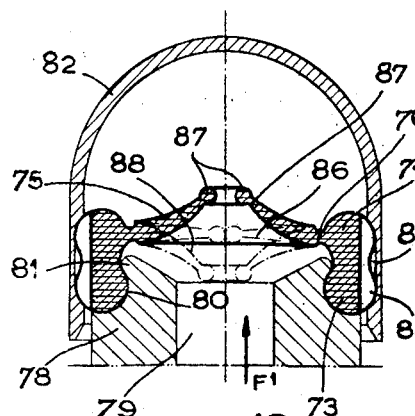
FIGURE 10 is a view in cross-section of a valve-body connected to an enclosed space and comprising a valve with a two-fold direction of opening.
Figure 11:
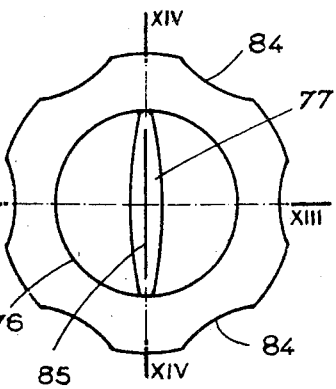
FIGURES 11 and 12 are respectively plan views of the valve of FIGURE 10 in the closed and in the open positions.
Figure 12:
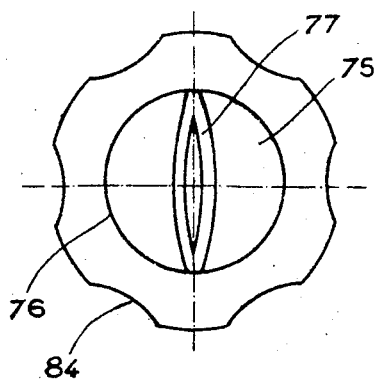
Figure 13:
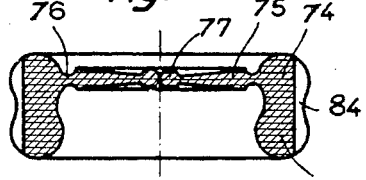
FIGURES 13 and 14 are respectively diametrical cross-sections of the valve of FIGURE 11 along the lines XIX—XIX and XX—XX.
Figure 14:
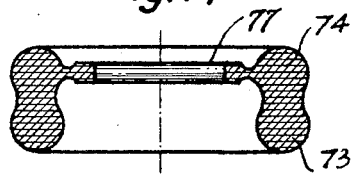

According to FIGURE 10, the valve with two-fold direction of opening is made up of a crown formed by two tores 73 and 74, and a diaphragm 75, connected to the tore 74 by a hinge 76 resulting from two circular grooves provided on each face of the diaphragm which has moreover a diametrical slit edged by two lips 77. The whole of the device comprises, on the one hand, a tubular support 78 with central pipe 79 connected with the enclosed space to be controlled and provided in its upper part with a circular groove 80 and with a lip 81 serving as housing for the lower internal face of the crown, which is fixed there under tension, on the other hand, a casing 82 fixed onto the tores 73 and 74 of the crown by means of a circular groove 83 arranged at its lower part and channels 84 provided on the external lateral face of the crown. FIGURE 11 shows the channels 84, as well as the slit 85 edged by the lips 77 in tight contact in the position of rest of the valve (position 86, FIGURE 10).

The operation is as follows:

When the pressure, increasing in the piping 79 (arrow $F_1$) exceeds a pre-determined value, the diaphragm 75 is lifted and the two lips 77 separate from one another (position 87 of FIGURE 10 and FIGURE 12), the fluid escapes towards the casing 82 and is then evacuated through the orifices corresponding to the channels 84. When the pressure in 79 falls back to its pre-determined valve, the diaphragm regains its position 86.

If, on the other hand, a depression is caused, exceeding a pre-determined value, in the piping 79, the diaphragm is lowered and the lips separated from one another (postion 88), thus allowing the air to penetrate into the interior of the piping 79 through the channels 84 until, the depression coming back to its predetermined value, the diaphragm resumes its position 86.

Figure 15:
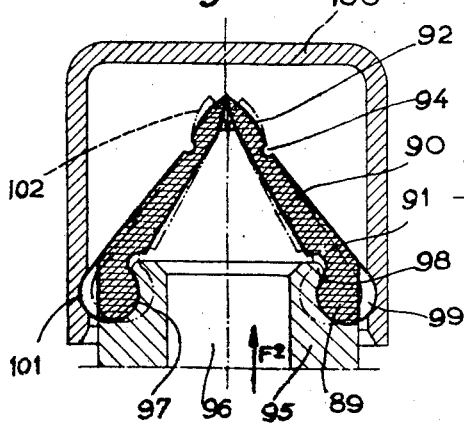
FIGURE 15 is a view in cross-section of an alternative comprising a valve with a single direction of opening.

According to FIGURE 15, the valve with single direction of opening is formed by a crown of toric shape 89 and a diaphragm 90 of conical shape connected, on the one hand, to the tore 89 by a hinge 91 and, on the other hand, to the lips 92 cut according to the cross 93 (FIGURE 16) by a hinge 94, each of these hinges resulting from a circular groove provided on the suitable face of the diaphragm. The tube 95 and its pipe 96, the circular groove 97 and the lip 98, the channels 99 of the crown, the casing 100 and its groove 101, play in the assemblage of the device a role similar to that of the preceding case.

The crown 89 of the valve is likewise fixed under tension in its groove, the drawing in dotted lines 102 indicating the shape of the valve before installation.

Figure 16:
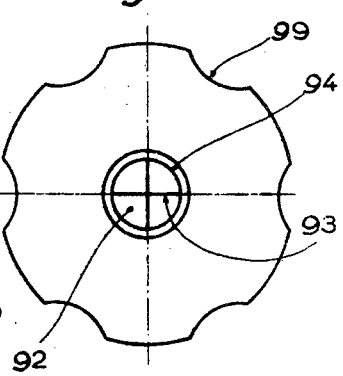
FIGURE 16 is a plan view of the valve of FIGURE 15.

The operation of the device of FIGURES 15 and 16 is as follows:

The valve, owing to its shape, can open in a single direction only.

When the pressure, increasing in the piping 96 (arrow $F_2$), exceeds a pre-determined value, the lips 92 separate from one another, allowing the fluid to escape through the channels indicated in the preceding device. When the pressure in 96 falls back to its pre-determined value, the lips of the elastic diaphragm close again and ensure once more a contact between them which is tight.

Of course, the present forms of embodiment have been indicated above all by way of example and alternatives can be conceived coming within the scope of the invention.

I claim:

1. A fluid flow control device comprising in combination with an axially extending first member defining a fluid passageway extending axially therethrough, a second member having a bell portion disposed in assembly with the first member radially outwardly thereof defining an annular space radially outwardly of the first member and having at least one exhaust opening providing communication between said space and the atmosphere, said second member having an axially extending portion defining an axial space relative to an end of said first member forming an assembly with the first member an extension of said through passageway, said space being in communication between the first mentioned space and the through passageway, an elastic member having a sleeve portion extending axially circumferentially of the first member in said annular space and radially spaced from the first member providing a passageway between it and the first member in communication with the atmosphere, the elastic member having a transverse portion of variable thickness at one end thereof extending radially inwardly of the sleeve portion and extending through said axial space transversely of said through passageway forming a deflectable portion deflectable in both directions axially of the through passageway, the transverse portion of the elastic member having a portion defining a central diaphragm portion provided with a slit coaxial with said through passageway to selectively define an orifice in said elastic member in response to differential fluid pressures in said through passageway on opposite sides of said central portion, said first member having an end annular surface forming a seat radially outwardly of said through passageway for said transverse portion of said elastic member, and said deflectable portion having a cross section dimensioned to permit it to be deflectable alternatively to said seat and away therefrom when a pressure differential exists in said through passageway sufficiently to cause said slit in said central portion of the elastic member to open and function as an orifice thereby to allow fluid flow through said through passageway and through said exhaust opening to atmosphere in dependence upon where said differential pressure seat said central portion on said seat or unseats it and to close said slit in the absence of a sufficient differential pressure.

2. A fluid flow control device comprising in combination an axially extending first member defining a fluid passageway extending axially therethrough, a second member having a bell portion disposed in assembly with the first member radially outwardly thereof defining an annular space radially outwardly of the first member and having at least one exhaust opening providing communication between said space and the atmosphere, said second member having an axially extending portion positionable axially spaced from the first member defining an axial space between them and having a fluid passageway therethrough forming in assembly with the first member an extension of said through passageway, said space being in communication between the first mentioned space and the through passageway, an elastic member having a sleeve portion extending axially circumferentially of the first member in said annular space and making a substantially fluid-tight seal at least with said first member, the elastic member having a transverse portion of variable thickness at one end thereof extending radially inwardly of the sleeve portion and extending through said axial space transversely of said through passageway forming a deflectable portion deflectable in both directions axially of the through passageway, the transverse portion of the elastic member having a portion defining a central diaphragm portion provided with a slit coaxial with said through passageway to selectively define an orifice in said elastic member in response to differential fluid pressures in said through passageway on opposite sides of said central portion, said first member and said axially extending portion of the second member having end annular surfaces circumferentially of said through passageway axially spaced forming seats for said transverse portion of said elastic member, said exhaust opening being disposed radially outwardly of one of said seats and adjacent thereto, said deflectable portion having a cross section dimensioned to permit it to be deflectable alternatively to said seats when a pressure differential exists in said through passageway sufficiently to cause said slit in said central portion of the elastic member to open and function as an orifice and said transverse portion to seat on one of said seats thereby to allow fluid flow completely through said through passageway and alternatively through a portion of said through passageway and said exhaust opening to atmosphere in dependence upon where said differential pressure seats said central portion on, and said elastic member comprising an annular recess on said deflectable transverse portion spaced radially outwardly, circumferentially of said slit and reducing the cross section of said transverse portion thereby to form an articulation for controlling the response of said deflectable portion to said pressure differential.

3. A fluid flow control device according to claim 2, in which said recess is disposed adjacent said sleeve portion.

4. A fluid flow control device according to claim 2, in which said recess is disposed enclosing said central diaphragm portion and spaced radially inwardly from said sleeve portion.

5. A fluid flow control device comprising in combination with an axially extending first member defining a fluid passageway extending axially therethrough, a second member having a bell portion disposed in assembly with the first member radially outwardly thereof defining an annular space radially outwardly of the first member and having at least one exhaust opening providing communication between said space and the atmosphere, said second member having an axially extending portion positionable axially spaced from the first member defining an axial space between them and having a fluid passageway therethrough forming in assembly with the first member an extension of said through passageway, said space being in communication between the first mentioned space and the through passageway, an elastic member having a sleeve portion extending axially circumferentially of the first member in said annular space and making a substantially fluid-tight seal at least with said first member, the elastic member having a transverse portion of variable thickness at one end thereof extending radially inwardly of the sleeve portion and extending through said axial space transversely of said through passageway forming a deflectable portion deflectable in both directions axially of the through passageway, the transverse portion of the elastic member having a portion defining a central diaphragm portion provided with a slit coaxial with said through passageway to selectively define an orifice in said elastic member in response to differential fluid pressures in said through passageway on opposite sides of said central portion, said first member and said axially extending portion of the second member having end annular surfaces circumferentially of said through passageway axially spaced forming seats for said transverse portion of said elastic member, said exhaust opening being disposed radially outwardly of one of said seats and adjacent thereto, said deflectable portion having a cross section dimensioned to permit it to be deflectable alternatively to said seats when a pressure differential exists in said through passageway sufficiently to cause said slit in said central portion of the elastic member to open and function as an orifice and said transverse portion to seat on one of said seats thereby to allow fluid flow completely through said through passageway and alternatively through a portion of said through passageway and said exhaust opening to atmosphere in dependence upon where said differential pressure seats said central portion on, and said deflectable portion having a head for closing said exhaust opening when deflected in a given direction in response to said differential pressure.

6. A fluid flow control device comprising in combination with an axially extending first member defining a fluid passageway extending axially therethrough, a second member having a bell portion disposed in assembly with the first member radially outwardly thereof defining an annular space radially outwardly of the first member and having at least one exhaust opening providing communication between said space and the atmosphere, said second member having an axially extending portion positionable axially spaced from the first member defining an axial space between them and having a fluid passageway therethrough forming in assembly with the first member an extension of said through passageway, said space being in communication between the first mentioned space and the through passageway, an elastic member having a sleeve portion extending axially circumferentially of the first member in said annular space, slidable freely thereon and making a substantially fluid-tight seal therewith, the elastic member having a transverse portion of variable thickness at one end thereof extending radially inwardly of the sleeve portion and extending through said axial space transversely of said through passageway forming a deflectable portion deflectable in both directions axially of the through passageway, the transverse portion of the elastic member having a portion defining a central diaphragm portion provided with a slit coaxial with said through passageway to selectively define an orifice in said elastic member in response to differential fluid pressures in said through passageway on opposite sides of said central portion, said first member and said axially extending portion of the second member having end annular surfaces circumferentially of said through passageway axially spaced forming seats for said transverse portion of said elastic member, said exhaust opening being disposed radially outwardly of one of said seats and adjacent thereto, said deflectable portion having a cross section dimensioned to permit it to be deflectable alternatively to said seats when a pressure differential exists in said through passageway sufficiently to cause said slit in said central portion of the elastic member to open and function as an orifice and said transverse portion to seat on one of said seats thereby to allow fluid flow completely through said through passageway and alternatively through a portion of said through passageway and said exhaust opening to atmosphere in dependence upon where said differential pressure seats said central portion on.

7. A fluid flow control device comprising in combination with an axially extending first member defining a fluid passageway extending axially therethrough, a second member having a bell portion disposed in assembly with the first member radially outwardly thereof defining an annular space radially outwardly of the first member and having at least one exhaust opening providing communication between said space and the atmosphere, said second member having an axially extending portion positionable axially spaced from the first member defining an axial space between them and having a fluid passageway therethrough forming in assembly with the first member an extension of said through passageway, said space being in communication between the first-mentioned space and the through passageway, an elastic member having a sleeve portion extending axially circumferentially of the first member in said annular space, and making a fluid-tight connection with said member, the elastic member having a transverse portion of variable thickness at one end thereof extending radially inwardly of the sleeve portion and extending through said axial space transversely of said through passageway forming a deflectable portion deflectable in both directions axially of the through passageway, the transverse portion of the elastic member having a portion defining a central diaphragm portion provided with a slit coaxial with said through passageway to selectively define an orifice in said elastic member in response to differential fluid pressures in said through passageway on opposite sides of said central portion, said first member and said axially extending portion of the second member having end annular surfaces circumferentially of said through passageway axially spaced forming seats for said transverse portion of said elastic member, said exhaust opening being disposed radially outwardly of one of said seats and adjacent thereto, said deflectable portion having a cross section dimensioned to permit it to be deflectable alternatively to said seats when a pressure differential exists in said through passageway sufficiently to cause said slit in said central portion of the elastic member to open and function as an orifice and said transverse portion to seat on one of said seats thereby to allow fluid flow completely through said through passageway and alternatively through a portion of said through passageway and said exhaust opening to atmosphere in dependence upon where said differential pressure seats said central portion on, and said sleeve portion comprising an annular bead disposed circumferentially of said first member to hold said sleeve thereon and disposed to effect a seal between the first member and said bell portion of said second member.

8. A fluid flow control device comprising in combination with an axially extending first member defining a fluid passageway extending axially therethrough, a second member having a bell portion disposed in assembly with the first member radially outwardly thereof defining an annular space radially outwardly of the first member and having at least one exhaust opening providing communication between said space and the atmosphere, said second member having an axially extending portion positionable axially spaced from the first member defining an axial space between them and having a fluid passageway therethrough forming in assembly with the first member an extension of said through passageway, said space being in communication between the first-mentioned space and the through passageway, an elastic member having a sleeve portion extending axially circumferentially of the first member in said annular space, and making a fluid-tight connection with said member, the elastic member having a transverse portion of variable thickness at one end thereof extending radially inwardly of the sleeve portion and extending through said axial space transversely of said through passageway forming a deflectable portion deflectable in both directions axially of the through passageway and tapering toward the center, the transverse portion of the elastic member having a portion defining a central diaphragm portion provided with a slit coaxial with said through passageway to selectively define an orifice in said elastic member in response to differential fluid pressures in said through passageway on opposite sides of said central portion, said first member and said axially extending portion of the second member having end annular surfaces circumferentially of said through passageway axially spaced forming seats for said transverse portion of said elastic member, said exhaust opening being disposed radially outwardly of one of said seats and adjacent thereto, said deflectable portion having a cross section dimensioned and disposed to permit it to be deflectable in compression alternatively to said seats when a pressure differential exists in said through passageway sufficiently to cause said slit in said central portion of the elastic member to open and function as an orifice and said transverse portion to seat on one of said seats thereby to allow fluid flow completely through said through passageway and alternatively through a portion of said through passageway and said exhaust opening to atmosphere in dependence upon where said differential pressure seats said central portion on, and said sleeve portion comprising an annular bead disposed circumferentially of said first member to hold said sleeve thereon and disposed to effect a seal between the first member and said bell portion of said second member.

9. A fluid flow control device comprising in combination with an axially extending first member defining a fluid passageway extending axially therethrough, a second member having a bell portion disposed in assembly with the first member radially outwardly thereof defining an annular space radially outwardly of the first member and having at least one exhaust opening providing communication between said space and the atmosphere, said second member having an axially extending portion positionable axially spaced from the first member defining an axial space between them and having a fluid passageway therethrough forming in assembly with the first member an extension of said through passageway, said space being in comunication between the first-mentioned space and the through passageway, an elastic member having a sleeve portion extending axially circumferentially of the first member in said annular space, and making a fluid-tight connection with said member, the elastic member having a transverse portion of variable thickness at one end thereof extending radially inwardly of the sleeve portion and extending through said axial space transversely of said through passageway forming a deflectable portion deflectable in both directions axially of the through passageway and tapering toward the center, the transverse portion of the elastic member having a portion defining a central diaphragm portion provided with a slit coaxial with said through passageway to selectively define an orifice in said elastic member in response to differential fluid pressures in said through passageway on opposite sides of said central portion, said first member and said axially extending portion of the second member having end annular surfaces circumferentially of said through passageway axially spaced forming seats for said transverse portion of said elastic member, said exhaust opening being disposed radially outwardly of one of said seats and adjacent thereto, said deflectable portion having a cross section dimensioned and disposed to permit it to be deflectable in tension alternatively to said seas when a pressure differential exists in said through passageway sufficiently to cause said slit in said central portion of the elastic member to open and function as an orifice and said transverse portion to seat on one of said seats thereby to allow fluid flow completely through said through passageway and alternatively through a portion of said through passageway and said exhaust opening to atmosphere in dependence upon said differential pressure seats said central portion on, and said sleeve portion comprising an annular bead disposed circumferentially of said first member to hold said sleeve thereon and disposed to effect a seal between the first member and said bell portion of said second member.

10. A fluid flow control device comprising in combination with an axially extending first member defining a fluid passageway extending axially therethrough, a second member having a bell portion disposed in assembly with the first member radially outwardly thereof defining an annular space radially outwardly of the first member and having a plurality of exhaust openings providing communication between said space and the atmosphere, said second member having an axially extending portion positionable axially spaced from the first member defining an axial space between them and having a fluid passageway therethrough forming in assembly with the first member an extension of said through passageway, said space being in communication between the first-mentioned space and the through passageway, an elastic member having a sleeve portion extending axially circumferentially of the first member in said annular space, and making a fluid-tight connection with said member, the elastic member having a transverse portion of variable thickness at one end thereof extending radially inwardly of the sleeve portion and extending through said axial space transversely of said through passageway forming a deflectable portion deflectable in both directions axially of the through passageway, the transverse portion of the elastic member having a portion defining a central diaphragm portion provided with a slit coaxial with said through passageway to selectively define an orifice in said elastic member in response to differential fluid pressures in said through passageway on opposite sides of said central portion, said central diaphragm portion tapering inwardly toward said slit and the annular region of said deflectable portion radially outwardly of said diaphragm portion being thicker than said central portion and deflectable into position for closing said exhaust openings, said first member and said axially extending portion of the second member having end annular surfaces circumferentially of said through passageway axially spaced forming seats for said transverse portion of said elastic member, said exhaust openings being disposed angularly spaced radially outwardly of one of said seats and adjacent thereto, said deflectable portion having a cross section dimensioned to permit it to be deflectable alternatively to said seats when a pressure differential exists in said through passageway sufficiently to cause said slit in said central portion of the elastic member to open and function as an orifice and said transverse portion to seat on one of said seats thereby to allow fluid flow completely through said through passageway and alternatively through a portion of said through passageway and said exhaust openings to atmosphere in dependence upon where said differential pressure seats said central portion on, and said sleeve portion comprising an annular bead disposed circumferentially of said first member to hold said sleeve thereon and disposed to effect a seal between the first member and said bell portion of said second member.

References Cited in the file of this patent

UNITED STATES PATENTS

| 316,644 | Olson | Apr. 28, 1885 |
| 1,428,399 | Schilling | Sept. 5, 1922 |
| 2,322,631 | Groeniger | June 22, 1943 |
| 2,567,391 | Mead | Sept. 11, 1951 |
| 2,598,002 | Langdon | May 27, 1952 |
| 2,646,063 | Hayes | July 21, 1953 |

FOREIGN PATENTS

| 748,363 | Great Britain | May 2, 1956 |